(12) United States Patent
Yano et al.

(10) Patent No.: US 11,661,933 B2
(45) Date of Patent: May 30, 2023

(54) PIPING MEMBER AND FLUID TRANSPORT DEVICE

(71) Applicant: KOBELCO COMPRESSORS CORPORATION, Tokyo (JP)

(72) Inventors: Yoshio Yano, Kobe (JP); Hirokazu Shukuin, Hyogo (JP)

(73) Assignee: KOBELCO COMPRESSORS CORPORATION, Tokyo (JP)

( * ) Notice: Subject to any disclaimer, the term of this patent is extended or adjusted under 35 U.S.C. 154(b) by 290 days.

(21) Appl. No.: 16/759,961

(22) PCT Filed: Oct. 19, 2018

(86) PCT No.: PCT/JP2018/038967
§ 371 (c)(1),
(2) Date: Apr. 28, 2020

(87) PCT Pub. No.: WO2019/097953
PCT Pub. Date: May 23, 2019

(65) Prior Publication Data
US 2020/0325885 A1 Oct. 15, 2020

(30) Foreign Application Priority Data
Nov. 16, 2017 (JP) .............................. JP2017-221220

(51) Int. Cl.
*F04B 39/12* (2006.01)
*F04C 29/12* (2006.01)
(Continued)

(52) U.S. Cl.
CPC ............ *F04B 39/123* (2013.01); *F04C 29/12* (2013.01); *F16L 9/006* (2013.01); *F16L 23/02* (2013.01); *F16L 43/00* (2013.01); *F04C 2230/21* (2013.01)

(58) Field of Classification Search
CPC ......... F04B 39/123; F04C 29/12; F16L 9/006; F16L 23/02; F16L 43/00
See application file for complete search history.

(56) References Cited

U.S. PATENT DOCUMENTS 1,357,259 A * 11/1920 Strong ........................ F23J 3/06
285/179
1,512,219 A * 10/1924 Goosmann ............ F16L 39/005
285/125.1
(Continued)

FOREIGN PATENT DOCUMENTS

| JP | H03151592 A | 6/1991 |
| JP | 2001-147093 A | 5/2001 |

(Continued)

OTHER PUBLICATIONS

International Preliminary Report on Patentability issued in PCT/JP2018/038967; dated May 28, 2020.
(Continued)

*Primary Examiner* — James M Hewitt, II
(74) *Attorney, Agent, or Firm* — Studebaker & Brackett PC

(57) ABSTRACT

A vibration suppressing piping member suppresses vibration caused by a pulsating discharged gaseous fluid. The piping member includes a tubular portion and flange portions at both ends of the tubular portion. A bent portion is formed between the two flange portions. The two flange portions are directly connected to each other.

13 Claims, 5 Drawing Sheets

(51) Int. Cl.
*F16L 9/00* (2006.01)
*F16L 23/02* (2006.01)
*F16L 43/00* (2006.01)

(56) References Cited

U.S. PATENT DOCUMENTS

| | | | | |
|---|---|---|---|---|
| 5,845,386 | A * | 12/1998 | Watts | F16L 23/16 |
| | | | | 285/31 |
| 5,899,669 | A | 5/1999 | Van Grimberge | |
| 5,941,231 | A * | 8/1999 | Garrett | F24H 6/00 |
| | | | | 126/315 |
| 6,561,549 | B1 * | 5/2003 | Moris | F16L 27/0841 |
| | | | | 285/272 |
| 7,137,578 | B2 * | 11/2006 | Steingass | B05B 15/652 |
| | | | | 239/587.2 |
| 10,626,833 | B2 * | 4/2020 | Uchibori | F02M 35/108 |
| 11,035,327 | B2 * | 6/2021 | Uchibori | F02M 26/41 |
| 2005/0247294 | A1 * | 11/2005 | Rowells | F01N 13/1827 |
| | | | | 285/267 |
| 2011/0277466 | A1 * | 11/2011 | Danielewicz | F01N 13/10 |
| | | | | 29/888.01 |
| 2014/0361535 | A1 * | 12/2014 | Lutz | F16L 23/024 |
| | | | | 285/382.5 |
| 2014/0367960 | A1 | 12/2014 | Uenishi et al. | |
| 2018/0030876 | A1 * | 2/2018 | Miyoshi | F01N 3/021 |

FOREIGN PATENT DOCUMENTS

| | | |
|---|---|---|
| JP | 2003-042378 A | 2/2003 |
| JP | 2017-009265 A | 1/2017 |
| TW | M272906 U | 8/2005 |
| WO | WO-2017169700 A1 * | 10/2017 ............. F02B 67/00 |

OTHER PUBLICATIONS

International Search Report issued in PCT/JP2018/038967; dated Dec. 25, 2018.

* cited by examiner

PIPING MEMBER AND FLUID TRANSPORT DEVICE

CROSS-REFERENCE TO RELATED APPLICATIONS

This is a national phase application in the United States of International Patent application No. PCT/JP2018/038967 with an international filing date of Oct. 19, 2018, which claims priority of Japanese Patent Application No. 2017-221220 filed on Nov. 16, 2017. The contents of the application are incorporated herein by reference.

TECHNICAL FIELD

The present invention relates to a piping member and a fluid transport device including the piping member.

BACKGROUND ART

In a fluid transport device that transports fluid, when air compressed by an air compressor is transported, in order to cool the compressed and hot air with a heat exchanger, a configuration is used in which a compressed air outlet of an air compressor and a heat exchanger are connected by a piping member, for example. Then, such a piping member tends to resonate with the pulsating component of the discharge air, and the resonance vibration may adversely affect an air compressor or the like connected to the piping member.

JP H10-30569 A discloses that a flexible connecting portion is provided between a compression portion and a cooling portion in order to suppress vibration of a piping member due to discharge air.

SUMMARY OF THE INVENTION

Problems to be Solved by the Invention

However, in order to provide the flexible connecting portion, the structure of the piping member becomes complicated, and further, a sufficient space for securing the amount of bending of the flexible connecting portion is required. In addition, the use of the flexible connecting portion increases the cost as compared with an inflexible piping member.

Thus, an object of the present invention is to provide a piping member capable of reducing vibration accompanying transport of a fluid with a simple structure, and a fluid transport device including the piping member.

Solutions to the Problems

A first aspect of the present invention is a piping member including: a tubular portion; and flange portions at both ends of the tubular portion. A bent portion is formed between the two flange portions. The two flange portions are directly connected to each other.

According to the above configuration, directly connecting the two flange portions to each other allows the rigidity of the piping member to be improved, and as a result, the vibration of the piping member due to the fluid passing through the piping member can be reduced.

The first aspect preferably further includes the following configuration.

(1) A reinforcing member configured to connect a connecting portion between the two flange portions and the bent portion is provided.

According to the configuration (1), the rigidity of the piping member can be further improved by the reinforcing member.

(2) Each of the two flange portions has a rectangular shape.

According to the configuration (2), the length of the connecting portion of the two flange portions can be secured, and further, the attaching bolts of each of the flange portions can be arranged evenly.

(3) A bending angle of the bent portion is 90 degrees.

According to the configuration (3), setting the bending of the piping member to 90 degrees can facilitate the positioning of the piping member.

(4) The piping member is made of a casting.

According to the configuration (4), the structure in which the two flange portions are connected can be easily formed by the casting.

According to a second aspect of the present invention, a fluid transport device includes: a fluid machine main body; a downstream side apparatus positioned on a fluid flow downstream side of the fluid machine main body; and a pipe configured to connect the fluid machine main body and the downstream side apparatus. The pipe includes two or more bent portions, and is configured by connecting a plurality of piping materials. At least one of the piping materials is a piping member according to the first aspect.

According to the configuration, reducing the vibration of at least one piping material of the pipe configured by connecting a plurality of piping materials allows the vibration of the entire pipe to be also reduced.

According to a third aspect of the present invention, a fluid transport device includes: a fluid machine main body; a downstream side apparatus positioned on a fluid flow downstream side of the fluid machine main body; and a pipe configured to connect the fluid machine main body and the downstream side apparatus. The pipe includes two or more bent portions, and is configured by connecting a plurality of piping materials. Of the pipe, a most downstream side piping material including a bent portion positioned on a fluid flow most downstream side is a piping member according to the first aspect.

According to the above configuration, improving the rigidity of the most downstream side piping material farthest from the fluid machine main body allows the propagation of the vibration to the fluid machine main body to be reduced.

The third aspect preferably further includes the following configuration.

(5) A length of a flow path of the most downstream side piping material is smaller than a length of a flow path of each of the other piping materials.

According to the configuration (5), making the length of the flow path of the most downstream side piping material smaller than the length of the flow path of another piping material allows the rigidity of the most downstream side piping material to be improved. As a result, propagation of vibration to the fluid machine main body can be further reduced.

(6) The pipe includes a first pipe connected to the fluid machine main body, and a second pipe whose fluid flow upstream end is connected to the first pipe and whose fluid flow downstream end is connected to the downstream side apparatus. The first pipe includes a first straight pipe portion, a first bent portion, a second straight pipe portion, a second bent portion, and a third straight pipe portion in order from a fluid flow upstream side toward a downstream side. A connecting portion between the two flange portions of the second pipe is linear. The connecting portion forms an angle on an acute angle side of 45 degrees or less with a first plane where an axis of the first straight pipe portion, an axis of the second straight pipe portion, and an axis of the third straight pipe portion are positioned.

According to the configuration (6), since pulsation is likely to occur in the direction parallel to the first plane, reducing the angle between the connecting portion and the first plane allows the vibration reducing effect of the pipe to be improved.

(7) In the configuration (6), the connecting portion is parallel to the first plane.

According to the configuration (7), setting the connecting portion and the first plane to be parallel allows the vibration reducing effect of the pipe to be further improved.

The second aspect or the third aspect preferably further includes the following configuration.

The fluid machine main body is a compressor configured to compress and discharge a supplied fluid (mainly including gas).

The pipe of the compressor such as an air compressor is required to have heat resistance and strength because the discharge fluid of the compressor is at high temperature and high pressure, and is required to have vibration resistance because the pulsating exciting force of the discharge fluid is large. Therefore, according to the present configuration, more advantageous effects can be exhibited in the compressor pipe, particularly in the pipe on the discharge side.

Effect of the Invention

According to the present invention, a piping member capable of reducing vibration accompanying transport of a fluid with a simple structure, and a fluid transport device including the piping member can be provided.

EMBODIMENTS OF THE INVENTION

In the following, embodiments of the present invention will be described with reference to the accompanying drawings.

Figure 1:
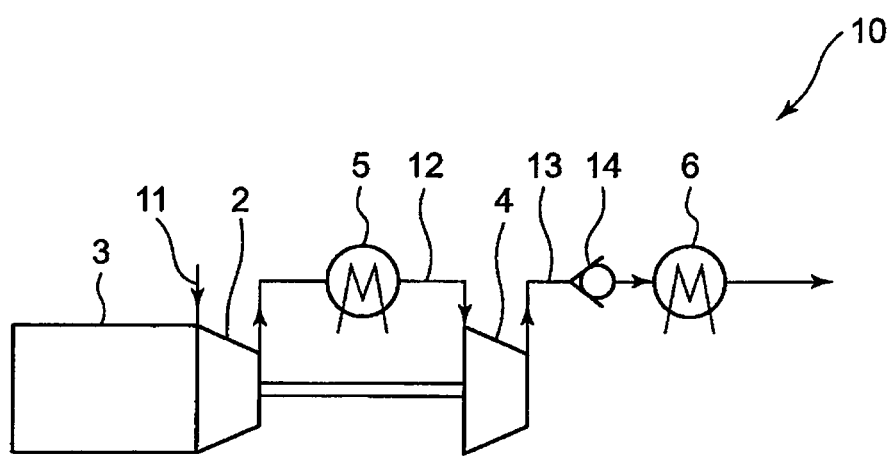
FIG. 1 is an overall configuration diagram of a fluid transport device including a piping member according to an embodiment of the present invention.

FIG. 1 is an overall configuration diagram of a fluid transport device 10 including a piping member according to an embodiment of the present invention. As shown in FIG. 1, the fluid transport device 10 includes, as a two-stage air compressor, a first-stage compressor main body 2 on a low-pressure side, a motor 3, a second-stage compressor main body 4 on a high-pressure side, an intercooler 5, a check valve 14, an aftercooler 6, a suction flow path 11, an intermediate flow path 12, and a discharge flow path 13. In the present embodiment, the rotor shaft of the first-stage compressor main body 2 is configured to be driven to rotate by the motor 3 and to rotate in synchronization with the rotor shaft of the second-stage compressor main body 4.

The suction flow path 11 is connected to a suction port of the first-stage compressor main body 2. The intercooler 5 is disposed in the intermediate flow path 12 connecting the discharge port of the first-stage compressor main body 2 and the suction port of the second-stage compressor main body 4. The check valve 14 and the aftercooler 6 are disposed in the discharge flow path 13 connected to a discharge port of the second-stage compressor main body 4. Each of the intercooler 5 and the aftercooler 6 functions as a cooler for cooling the compressed air.

In the fluid transport device 10, the air sucked from the suction flow path 11 is compressed by the first-stage compressor main body 2. The compressed air compressed by the first-stage compressor main body 2 is cooled by the intercooler 5 in the intermediate flow path 12 and sent to the second-stage compressor main body 4. The compressed air is further compressed by the second-stage compressor main body 4, and then discharged to the discharge flow path 13, cooled by the aftercooler 6, and supplied to the supply destination.

Figure 2:
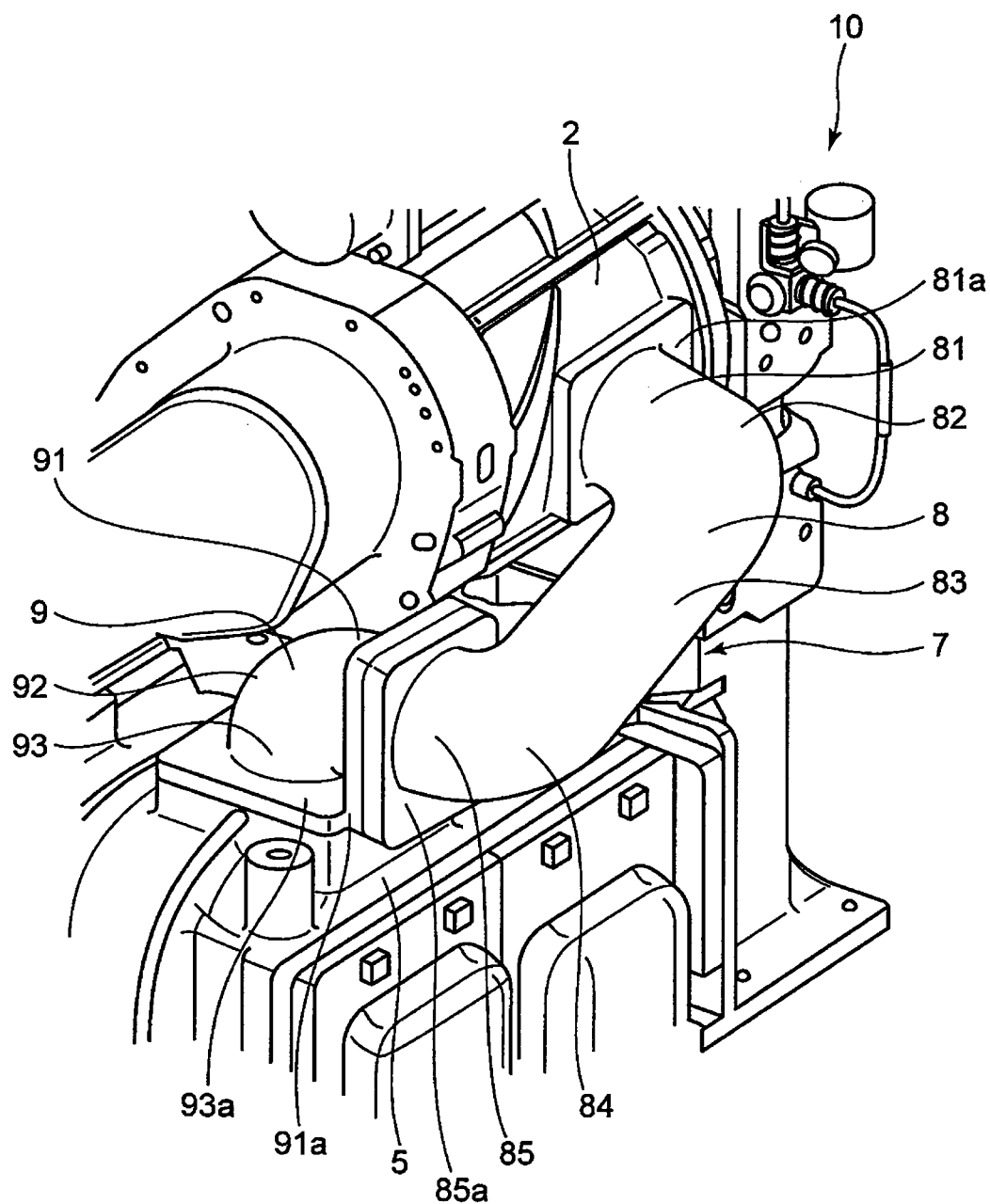
FIG. 2 is a perspective view showing a portion from a first-stage compressor main body to an intercooler in the fluid transport device.

FIG. 2 is a perspective view showing a portion from the first-stage compressor main body 2 to the intercooler 5 in the fluid transport device 10. As shown in FIG. 2, the first-stage compressor main body 2 and the intercooler 5 are connected to each other by a piping member 7 forming the intermediate flow path 12.

The piping member 7 includes a first piping material 8 connected to the first-stage compressor main body 2, and a second piping material 9 whose fluid flow upstream end is connected to the first piping material 8, and whose fluid flow downstream end is connected to the intercooler 5.

The first piping material 8 includes, as a tubular portion in order from the fluid flow upstream side toward the downstream side, a first straight pipe portion 81, a first bent portion 82, a second straight pipe portion 83, a second bent portion 84, and a third straight pipe portion 85. The first straight pipe portion 81 is formed with a rectangular (rectangle or square shape) flange portion 81a, and the flange portion 81a is connected to the first-stage compressor main body 2. The first straight pipe portion 81 and the second straight pipe portion 83 form an angle of 90 degrees by the first bent portion 82. More specifically, the angle between the axis of the first straight pipe portion 81 and the axis of the second straight pipe portion 83 is 90 degrees. In addition, the second straight pipe portion 83 and the third straight pipe portion 85 form an angle of 90 degrees by the second bent portion 84. More specifically, the angle between the axis of the second straight pipe portion 83 and the axis of the third straight pipe portion 85 is 90 degrees. The third straight pipe portion 85 is formed with a rectangular flange portion 85a, and the flange portion 85a is connected to the second piping material 9.

Figure 3:
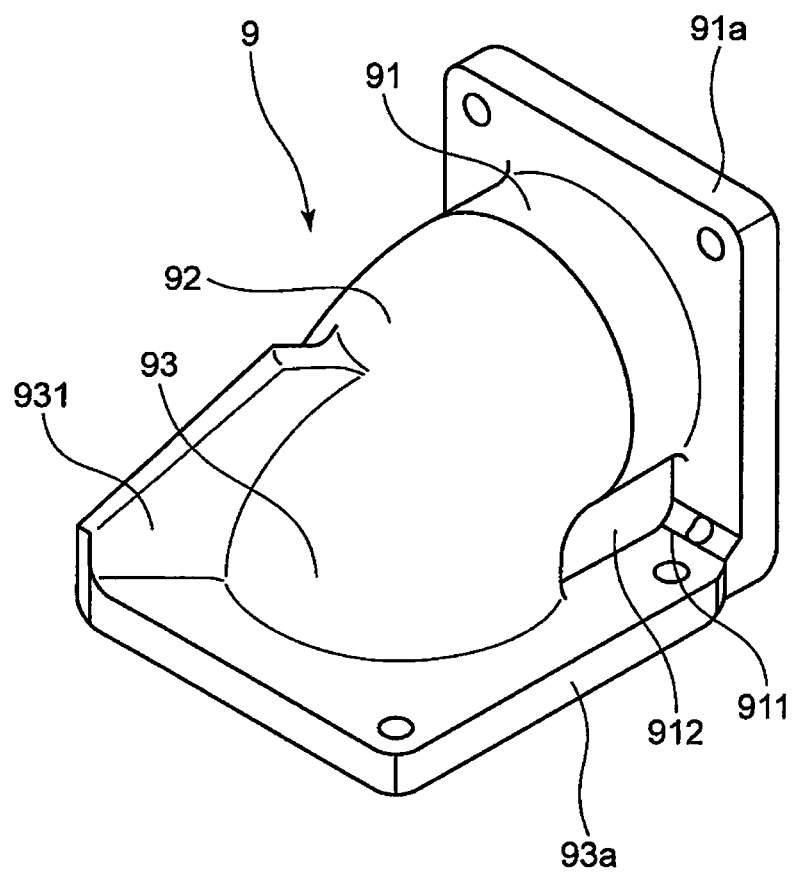
FIG. 3 is a perspective view of a second piping material.
Figure 4:
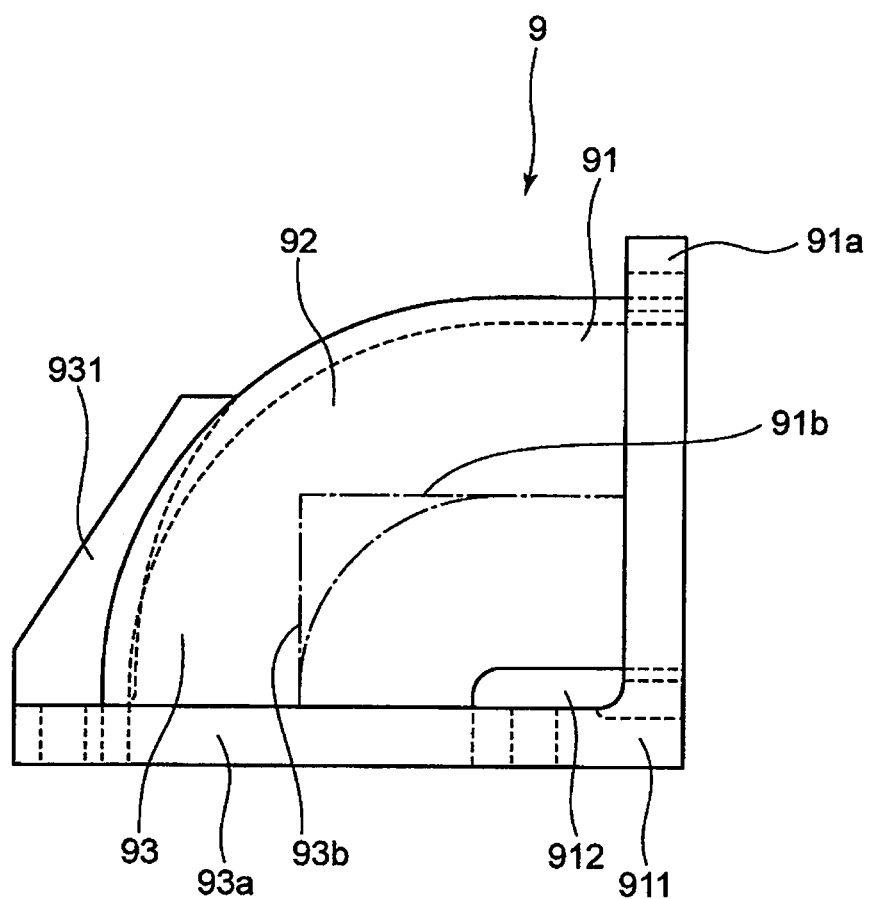
FIG. 4 is a side view of FIG. 3.

FIG. 3 is a perspective view of the second piping material 9, and FIG. 4 is a side view of FIG. 3. As shown in FIGS. 3 and 4, the second piping material 9 includes, as a tubular portion in order from the fluid flow upstream side toward the downstream side, a fourth straight pipe portion 91, a third bent portion 92, and a fifth straight pipe portion 93. The fourth straight pipe portion 91 is formed with a rectangular flange portion 91a, and the flange portion 91a is connected to the flange portion 85a of the third straight pipe portion 85. The fourth straight pipe portion 91 and the fifth straight pipe portion 93 form an angle of 90 degrees by the third bent portion 92. More specifically, the angle between the axis 91b of the fourth straight pipe portion 91 and the axis 93b of the fifth straight pipe portion 93 is 90 degrees. The fifth straight pipe portion 93 is formed with a rectangular flange portion 93a, and the flange portion 93a is connected to the intercooler 5.

The length of the flow path of the second piping material 9 being the most downstream pipe, that is, the length of the axial center line from the inlet to the outlet of the second piping material 9 is smaller than the length of the flow path of the first piping material 8 being the upstream side pipe, that is, the length of the axial center line from the inlet to the outlet of the first piping material 8.

The flange portion 91a of the fourth straight pipe portion 91 and the flange portion 93a of the fifth straight pipe portion 93 are directly connected to each other. Specifically, the second piping material 9 is made of a casting, and the fourth straight pipe portion 91, the third bent portion 92, and the fifth straight pipe portion 93 are integrally formed. Then, the connecting portion 911 between the flange portion 91a and the flange portion 93a is also formed integrally with other members by casting. It should be noted that the second piping material 9 is formed such that the thickness of the flange portions 91a and 93a is greater than the wall thickness of the tubular portion of the second piping material 9.

Figure 5:
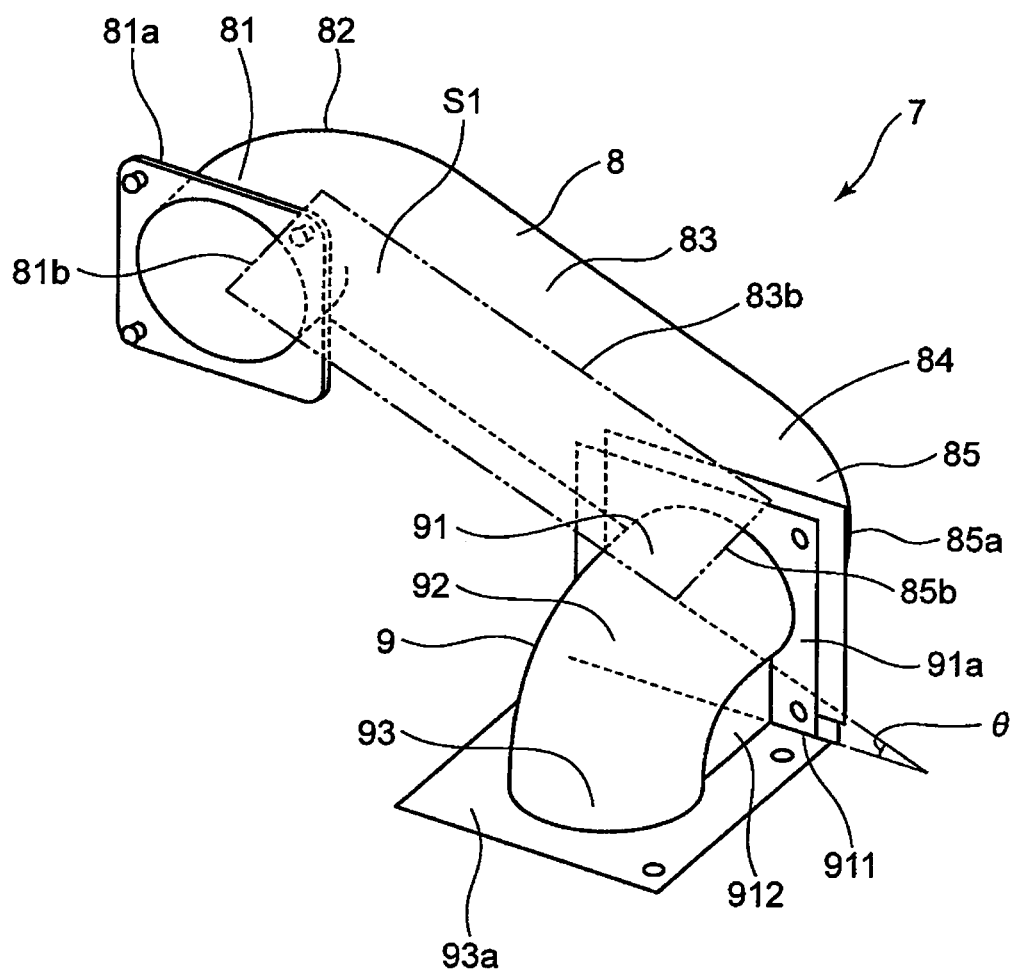
FIG. 5 is a perspective view of a piping member.

FIG. 5 is a perspective view of the piping member 7. As shown in FIG. 5, the connecting portion 911 is linear, and forms an angle θ on the acute angle side of 45 degrees or less with the first plane S1 where the axis 81b of the first straight pipe portion 81, the axis 83b of the second straight pipe portion 83, and the axis 85b of the third straight pipe portion 85 in the first piping material 8 are positioned. Specifically, it is preferable that the angle θ be 0 degree, that is, the connecting portion 911 be parallel to the first plane S1.

In addition, in a space formed between the connecting portion 911 and the third bent portion 92, a reinforcing member 912 that directly connects the connecting portion 911 and the third bent portion 92 is provided. As shown in FIGS. 3 and 4, the reinforcing member 912 may be a rib filling the entire space between the connecting portion 911 and the third bent portion 92, and may be a rod-shaped or plate-shaped member which is positioned in the space between the connecting portion 911 and the third bent portion 92 and which simply connects the connecting portion 911 and the third bent portion 92. Furthermore, a rib 931 that directly connects the third bent portion 92 and the flange portion 93a is formed along the outer peripheral surface of the third bent portion 92 and the outer peripheral surface of the fifth straight pipe portion 93.

According to the piping member 7 having the above configuration, the following effects can be exerted.

(1) Directly connecting the two flange portions 91a and 93a to each other allows the rigidity of the piping member 7 to be improved, and as a result, the vibration of the piping member 7 due to the discharge fluid passing through the piping member 7 can be reduced.

(2) Since the reinforcing member 912 that connects the connecting portion 911 of the two flange portions 91a and 93a and the bent portion 92 is provided, the rigidity of the piping member 7 can be further improved by the reinforcing member 912.

(3) Since each of the two flange portions 91a and 93a has a rectangular shape, the length of the connecting portion 911 of the two flange portions 91a and 93a can be secured, and further, the attaching bolts of each of the flange portions 91a and 93a can be arranged evenly.

(4) Since the bending angle of the bent portion 92 is 90 degrees, the positioning of the piping member 7 can be facilitated.

(5) Since the piping member 7 is made of a casting, the structure in which the flange portions 91a and 93a are connected can be easily formed by the casting.

(6) Reducing the vibration of the second piping material 9 being at least one piping material of the piping member 7 configured by connecting the plurality of piping materials 8 and 9 allows the vibration of the entire piping member 7 to be also reduced.

(7) Improving the rigidity of the second piping material 9 farthest from the first-stage compressor main body 2 of the piping member 7 makes it possible to reduce the propagation of vibration to the first-stage compressor main body 2.

(8) Of the piping member 7, making the length of the flow path of the second piping material 9 being the most downstream side piping material smaller than the length of the flow path of the first piping material 8 being another piping material allows the rigidity of the second piping material 9 to be improved. As a result, propagation of vibration to the first-stage compressor main body 2 can be further reduced.

(9) Since pulsation is likely to occur in the direction parallel to the first plane S1, reducing the angle between the connecting portion 911 and the first plane S1 allows the vibration reducing effect of the piping member 7 to be improved.

(10) Setting the connecting portion 911 and the first plane S1 to be parallel allows the vibration reducing effect of the piping member 7 to be further improved.

(11) The pipe of the air compressor is required to have heat resistance and strength because the discharge fluid of the air compressor is at high temperature and high pressure, and is required to have vibration resistance because the pulsating exciting force of the internal fluid is large. Therefore, connecting the two flange portions 91a and 93a allows a more advantageous vibration reducing effect to be obtained in the piping member 7 of the air compressor.

(12) Since the rib 931 that directly connects the third bent portion 92 and the flange portion 93a is formed on the outer peripheral surface of the third bent portion 92, the rigidity of the second piping material 9 can be further improved by the rib 931. As a result, vibration of the entire piping member 7 can be reduced.

(13) The piping member 7 includes two of the first piping material 8 and the second piping material 9, but may include three or more piping materials connected. In this case, connecting the flange of the most downstream side pipe allows the rigidity of the most downstream side pipe to be improved and allows propagation of vibration from the most downstream side pipe to the fluid machine to be reduced. Furthermore, making the rigidity of the most downstream side pipe greater than the rigidity of the upstream side pipe allows a structure in which the vibration of the most downstream side pipe is unlikely to propagate to the upstream side to be obtained.

In the above embodiment, in the second piping material 9, the fourth straight pipe portion 91 and the fifth straight pipe portion 93 form an angle of 90 degrees, and if there is a bend of not less than 45 degrees and less than 180 degrees, the vibration reducing effect due to the direct connection between the flange portion 91a of the fourth straight pipe portion 91 and the flange portion 93a of the fifth straight pipe portion 93 is significantly exhibited.

In the above embodiment, the piping member 7 includes the first piping material 8 on the upstream side and the second piping material 9 on the downstream side, but may include three or more piping materials. In this case, the flange portions at both ends of at least one piping material have only to be directly connected, and it is preferable that the flange portions at both ends of the most downstream side piping material be directly connected. This is because improving the rigidity of the most downstream side piping material farthest from the first-stage compressor main body 2 allows propagation of vibration to the first-stage compressor main body positioned on the upstream side of the piping member 7 to be effectively reduced. It should be noted that when flange portions independent of each other (not directly connected to each other) are formed at both ends of the piping material, the flange portions formed at the ends of the piping material themselves may serve as weights and may cause vibration. Also for reducing such a possibility and reducing vibration, it is effective that the flange portions at both ends of one piping material are directly connected to each other. Even in that case, preferably in the piping material on the downstream side among a plurality of piping materials, and more preferably, as described above, in the most downstream side piping material, it is effective that the flange portions at both ends thereof are directly connected to each other.

In addition, when the piping member 7 includes three or more piping materials, it is preferable that the length of the flow path of the most downstream side piping material be smaller than the length of the flow path of another piping material. Thus, the rigidity of the most downstream side piping material can be improved. As a result, propagation of vibration to the first-stage compressor main body 2 positioned on the upstream side of the piping member 7 can be effectively reduced.

In the above embodiment, the rib 931 that connects the third bent portion 92 and the flange portion 93a is provided, but a rib that connects the third bent portion 92 and the flange portion 91a may be provided. In addition, a rib which is disposed along the outer peripheral surfaces of the fourth straight pipe portion 91, the third bent portion 92, and the fifth straight pipe portion 93, and which connects the flange portions 91a and 93a may be provided.

In the above embodiment, a piping member that connects the first-stage compressor main body 2 and the intercooler 5 of the fluid transport device 10 is described as an example, but the present invention may be applied to a piping member that connects the second-stage compressor main body 4 and the aftercooler 6.

In the above embodiment, the rotor shaft of the first-stage compressor main body 2 is driven to rotate by the motor 3, and is configured to rotate in synchronization with the rotor shaft of the second-stage compressor main body 4, but the motor that drives the first-stage compressor main body and the motor that drives the second-stage compressor main body may be different.

In the above embodiment, an example in which the fluid transport device 10 includes an air compressor is described, but the present invention can be applied to overall fluid transport devices in which vibration occurs due to the flow of a fluid.

The present invention is not limited to the configuration described in the above embodiment, and can include various modifications conceivable by those skilled in the art without departing from the contents described in the claims.

The invention claimed is:

1. A piping member comprising:
 a tubular portion; and
 flange portions protruding in a radial direction from an outer periphery of the end of the tubular portion at both ends of the tubular portion,
 wherein a bent portion is formed between the two flange portions,
 wherein the two flange portions contact each other to be directly connected to each other and are integrally formed, and
 wherein a reinforcing member configured to connect a connecting portion between the two flange portions and the bent portion is provided, the reinforcing member is a member filling the entire space between the connecting portion and the bent portion or a rod-shaped or plate-shaped member which is positioned in the space between the connecting portion and the bent portion and which connects the connecting portion and the bent portion, and the reinforcing member includes a periphery, the periphery being entirely enclosed by the two flange portions and the tubular portion.

2. The piping member according to claim 1, wherein each of the two flange portions has a rectangular shape.

3. The piping member according to claim 1, wherein a bending angle of the bent portion is 90 degrees.

4. The piping member according to claim 1, wherein the piping member is made of a casting.

5. A fluid transport device comprising:
 a fluid machine main body;
 a downstream side apparatus positioned on a fluid flow downstream side of the fluid machine main body; and
 a pipe configured to connect the fluid machine main body and the downstream side apparatus,
 wherein the pipe includes two or more bent portions, and is configured by connecting a plurality of piping materials, and
 wherein at least one of the piping materials is a piping member according to claim 1.

6. The fluid transport device according to claim 5, wherein the fluid machine main body is a compressor configured to compress and discharge a supplied fluid.

7. A fluid transport device comprising:
 a fluid machine main body;
 a downstream side apparatus positioned on a fluid flow downstream side of the fluid machine main body; and
 a pipe configured to connect the fluid machine main body and the downstream side apparatus,
 wherein the pipe includes two or more bent portions, and is configured by connecting a plurality of piping materials, and
 wherein of the pipe, a most downstream side piping material including a bent portion positioned on a fluid flow most downstream side is a piping member according to claim 1.

8. The fluid transport device according to claim 7, wherein a length of a flow path of the most downstream side piping material is smaller than a length of a flow path of each of the other piping materials.

9. The fluid transport device according to claim 7,
 wherein the pipe includes a first pipe connected to the fluid machine main body, and a second pipe whose fluid flow upstream end is connected to the first pipe and whose fluid flow downstream end is connected to the downstream side apparatus,
 wherein the first pipe includes a first straight pipe portion, a first bent portion, a second straight pipe portion, a second bent portion, and a third straight pipe portion in order from a fluid flow upstream side toward a downstream side,
 wherein a connecting portion between the two flange portions of the second pipe is linear, and
 wherein the connecting portion forms an angle on an acute angle side of 45 degrees or less with a first plane where an axis of the first straight pipe portion, an axis of the second straight pipe portion, and an axis of the third straight pipe portion are positioned.

10. The fluid transport device according to claim 9, wherein the connecting portion is parallel to the first plane.

11. The fluid transport device according to claim 7, wherein the fluid machine main body is a compressor configured to compress and discharge a supplied fluid.

12. The piping member according to claim 1, wherein the piping member has the effect of suppressing vibration caused by a pulsating discharged gaseous fluid.

13. A piping member that has the effect of suppressing vibration caused by a pulsating discharged gaseous fluid, comprising:
   a tubular portion;
   flange portions at both ends of the tubular portion; and
   a reinforcing member including a periphery,
   wherein the tubular portion includes a bent portion that is formed between the two flange portions,
   wherein each of said two flange portions extends outwardly from an outer peripheral surface of said tubular portion at respective ones of said ends of the tubular portion, whereby attaching bolts can be arranged around each of said two flange portions and extend through each of said two flange portions from outer faces of said flange portions to inner faces of said flange portions that extend outwardly from the outer peripheral wall of said tubular portion,
   wherein the two flange portions contact each other to be directly connected to each other along respective outer peripheral edges of each of said two flange portions such as to form a direct connection between the two flange portions, and
   wherein the periphery is entirely enclosed by the two flange portions and the tubular portion.

* * * * *